Jan. 20, 1959   C. A. PRICE ET AL   2,869,571
BALL COCK
Filed Jan. 2, 1957   2 Sheets-Sheet 2
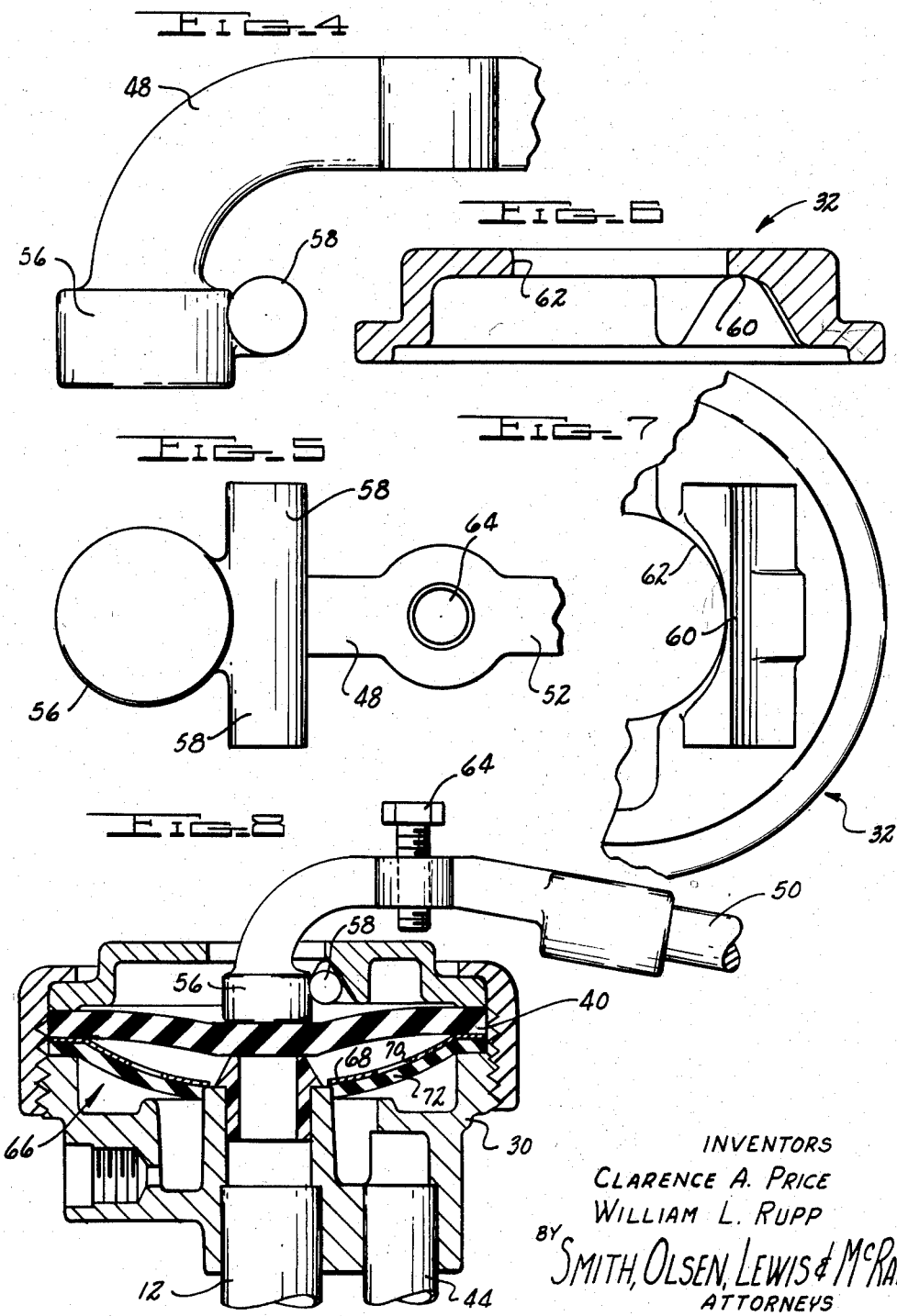
INVENTORS
CLARENCE A. PRICE
WILLIAM L. RUPP
BY SMITH, OLSEN, LEWIS & McRAE
ATTORNEYS United States Patent Office 2,869,571
Patented Jan. 20, 1959

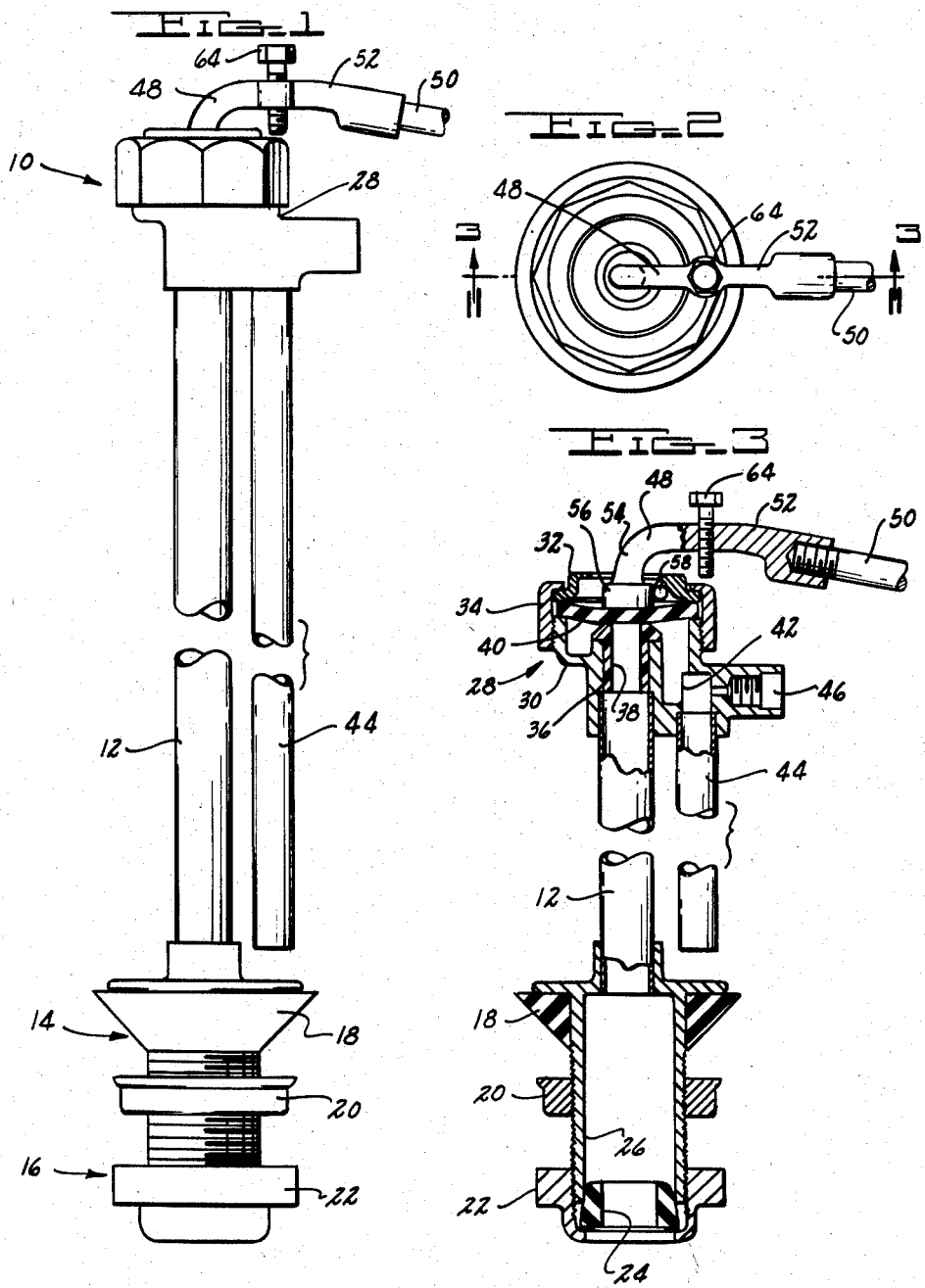

2,869,571

BALL COCK

Clarence A. Price and William L. Rupp, Ann Arbor, Mich., assignors, by mesne assignments, to Hoover Ball & Bearing Co., Ann Arbor, Mich., a corporation of Michigan Application January 2, 1957, Serial No. 632,174

6 Claims. (Cl. 137—215)

The present invention relates to a float valve or diaphragm-type ball cock for use in a water closet, and more particularly to improvements in the means for opening and closing this type of valve.

It is an object of the present invention to provide an improved diaphragm-type ball cock which is constructed and arranged so that a minimum number of moving elements are required for initiating and interrupting flow of fluid through the ball cock, thereby reducing to a minimum the opportunity for faulty operation of the ball cock.

It is another object of the present invention to provide an improved diaphragm-type ball cock of the foregoing character wherein the moving elements are constructed so that they can be produced in mass production quantities and can be easily and quickly assembled resulting in an economical, low cost unit.

It is still another object of the present invention to provide an improved ball cock of the foregoing character which is constructed and arranged so that the standpipe of the ball cock can be secured in place independently of the alignment of the movable elements of the valve, and thereafter the latter can be aligned and attached to a float arm.

Still another object of the present invention is to provide a diaphragm-type ball cock which is constructed and arranged so that it has a one-piece lever for engaging the diaphragm and to which a float arm may be secured, said lever including an integral pair of trunnions which can be pivotally mounted within the valve body of the ball cock, the lengths of the lever arms and the shape of the entire lever being such as to obtain the maximum mechanical advantage for applying closing pressure on the diaphragm, and to provide movement of the engaging end of the lever substantially normal to the diaphragm, thereby obtaining optimum closing and opening conditions for the ball cock.

Another object of the invention is to provide a one-piece lever of the foregoing character which is operably associated with an annular member of the valve casing in which the one-piece lever is pivotally mounted, said associated parts being constructed and arranged to permit manufacture thereof by die-casting processes and easy assembly of such die-cast parts.

Other objects of this invention will appear in the following description and appended claims, reference being had to the accompanying drawings forming a part of this specification wherein like reference characters designate corresponding parts in the several views.

In the drawings:

Figure 1 is an elevation of a ball cock embodying one modification of the present invention, Fig. 2 is a plan view of the embodiment illustrated in Fig. 1, Fig. 3 is a vertical section taken on the line 3—3 of Fig. 2, Fig. 4 is an enlarged fragmentary elevation of the lever used in the illustrated ball cock, Fig. 5 is an enlarged fragmentary bottom view of the lever shown in Fig. 4, Fig. 6 is an enlarged section of the top wall of the valve casing in which the lever illustrated in Figs. 4 and 5 is pivotally mounted, Fig. 7 is an enlarged fragmentary bottom view of the top wall, illustrated in Fig. 6, showing the seat in which the lever is pivotally mounted, and Fig. 8 is a modified form of the present invention including anti-siphon means preventing return flow through the ball cock.

Other objects of the invention will appear in the following description and appended claims. Before explaining the present invention in detail, it is to be understood that the invention is capable of other embodiments and of being practiced or carried out in various ways. It is also to be understood that the phraseology or terminology employed herein is for the purpose of description and not of limitation.

Referring now to the drawings, the embodiment of the invention illustrated in Figs. 1 through 7 will be described. The ball cock 10 is intended to be used in the water closet (not shown) of a toilet or the like. It includes a standpipe 12 having a connection 14 at its lower end adapted to be secured in an opening of the bottom wall of the water closet (not shown). It also has another connection 16 adapted to be secured to a water inlet pipe (not shown).

The connection 14 includes a rubber gasket 18 and a nut 20 which is adapted to be turned for clamping the bottom wall of the closet tightly between itself and the washer 18. The connection 16 includes the nut 22 and the gasket 24 which has a beveled outer surface so that when the nut 22 is turned up on the sleeve 26 the beveled surface will cause the gasket 24 to be squeezed inwardly around the water inlet pipe (not shown).

The upper end of the standpipe 12 carries a valve casing 28. The latter may be considered to include the bowl 30, the annular top wall 32 and the union nut 34 which is threadedly connected to the outer wall of the bowl 30. The bowl 30 has an opening 36 in its bottom wall for receiving the open end of the standpipe 12. A plastic valve seat 38 is mounted in the opening 36 and acts as the valve seat for the ball cock 10. A rubber valve diaphragm 40 extends across the interior of the valve casing 28 and is clamped in place between the upper lip of the bowl 30 and the outer edge of the annular top wall 32 by means of the union nut 34.

The bowl 30 has a discharge outlet 42, and a refill pipe 44 is connected with the bowl 30 in fluid communication with the outlet 42. Also in fluid communication with the outlet 42 is an overflow duct 46 of the conventional type. In the normal operation of the ball cock 10 the water will flow upward through the standpipe 12 past the valve seat 38 and out the refill pipe 44 into the water closet (not shown). This flow of water will be interrupted when the rubber valve diaphragm 40 is depressed against the valve seat 38 as is shown in Fig. 3.

The rubber valve diaphragm 40 is depressed in the present invention by the one piece lever 48 when the latter is pivoted by the float arm 50 which is threadedly connected to the free end of the lever 48. The lever 48 has a substantially horizontal portion 52 to which the float arm 50 is attached, and a substantially vertical portion 54 which has a terminal end 56 of a generally cylindrical shape. The end 56 normally will be in contact with the upper surface of the rubber valve diaphragm 40. Integrally connected to the end 56 are trunnions 58 about which the lever 48 is intended to pivot.

The annular top wall 32 has a groove 60 in its under surface which is substantially tangential to the opening 62 of the annular top wall 32. The groove 60 is of sufficient size so that it can receive the trunnions 58 and will provide a journal in which the lever 48 can pivot.

It will be observed that the trunnions 58 are substantially level with the cylindrical end 56 and are located relatively close to the axis of said end 56. By virtue of this arrangement the movement of the end 56 will be substantially vertical or normal to the diaphragm 40. Also, the lever arm between the end 56 and the trunnions 58 is as short as possible relative to the other lever arm which extends from the trunnions 58 to the end of the float arm 50. This assures that the maximum mechanical advantage is obtained for exerting pressure downward against the diaphragm 40 when the float arm 50 is raised, thereby preventing leakage past the valve seat 38 when the flow of water through the ball cock 10 is intended to be interrupted. The extent of pivotal movement of the lever 48 for opening the ball cock 10 may be controlled by the travel limit adjusting screw 64 which is threadedly connected to the lever 48 and is adapted to contact at its lower end the union nut 34.

From the foregoing description it will be apparent that the number of moving or pivotal elements in the ball cock 10 is kept at the absolute minimum. The lever 48 is a one-piece element which is securely connected to the float arm 50, and this integral assembly constitutes the one and only pivotally moving part. The only other element which moves during the operation of the ball cock is the rubber valve diaphragm 40. Furthermore, it is to be noted that the end 56 has a diameter slightly greater than the valve seat 38 and is coaxially aligned therewith so that on vertical movement of the end 56 uniform and even pressure will be exerted in a downward direction by the end 56 against the diaphragm 40 and the valve seat 38. Thus, a uniform pressure will be exerted by the diaphragm 40 on the edges of the valve seat 38.

It is to be observed also that the connections at the lower end of the standpipe 12 can be made to the water closet (not shown) and the water inlet pipe (not shown) without first aligning the pivotal elements 48 and 50 within the water closet (not shown). Thus, the lower connection can be made with the lever 48 and the annular top wall 32 loosely held in position by the union nut 34. After the connections 14 and 16 have been made, the plumber can thereafter assemble and tighten the various moving parts of the ball cock 10. This is an advantage which is not commonly found in the prior art and which makes it much easier for the plumber when initially installing the ball cock 10 in the water closet (not shown).

A modified form of the invention is shown in Fig. 8. This embodiment is substantially the same as the embodiment described in Figs. 1 through 7 and similar reference numerals are used in the modification of Fig. 8. This embodiment differs in that it includes an anti-siphoning valve 66 which is mounted in the bowl 30, being held in place between the diaphragm 40 and the upper lip of the bowl 30. The anti-siphoning valve includes the back-up plate 68 containing apertures 70 and the rubber flapper valve element 72. The anti-siphoning valve 66 operates so that water under pressure can flow from the standpipe 12 into the bowl 30, through the apertures 70 and out the refill pipe 44. However, siphoning of water back through the refill pipe 44 will be prevented because under these circumstances the pressure differential on opposite sides of the flapper valve element 72 will cause the latter to be pressed against the back-up plate 68 thereby closing the apertures 70. In other respects the embodiment of the invention disclosed in Fig. 8 will function the same as the embodiment of Figs. 1 through 7.

Having thus described our invention, we claim:

1. A ball cock comprising an upright standpipe, a valve casing including a bowl, an annular top wall for said bowl and a union nut for securing said top wall and bowl together, said bowl being mounted on said standpipe with the open end of the latter extending into said bowl, a diaphragm held between the lip of said bowl and said annular top wall in spaced relation to the open upper end of said standpipe, said diaphragm acting when depressed to close the open end of said standpipe, said annular top wall having a groove in its under surface normal to a radius of the opening in the annular top wall, and a one-piece lever having a horizontal portion adapted to be attached at its free end to a float arm and having a vertical portion extending downwardly through said opening in the annular top wall into engagement with said diaphragm, said vertical portion having horizontal trunnions seated in said groove about which said lever can pivot for depressing and releasing said diaphragm respectively on raising and lowering of the free end of said lever.

2. A ball cock comprising an upright standpipe, a valve casing mounted on the open upper end of said standpipe with the open end of the latter extending into said casing, a diaphragm extending across said casing in spaced relation to the open upper end of said standpipe, said diaphragm acting when depressed to close said open upper end, the top wall of said valve casing having an opening above said diaphragm and a groove in its under surface adjacent said opening, and a one-piece lever having a horizontal portion adapted to be attached at its free end to a float arm and having a vertical portion extending downwardly through said opening in the top wall into engagement with said diaphragm, said vertical portion having trunnions seated in said groove about which said lever can pivot for depressing and releasing said diaphragm respectively on raising and lowering of the free end of said lever.

3. A ball cock comprising an upright standpipe, a valve casing mounted on the open upper end of said standpipe with the open end of the latter extending into said casing, a diaphragm extending across said casing in spaced relation to the open upper end of said standpipe, said diaphragm acting when depressed to close said open upper end, the top wall of said valve casing having an opening above said diaphragm and a groove in its under surface adjacent said opening, a one-piece lever having a horizontal portion adapted to be attached at its free end to a float arm and having a vertical portion extending downwardly through said opening in the top wall into engagement with said diaphragm, said vertical portion having trunnions seated in said groove about which said lever can pivot for depressing and releasing said diaphragm respectively on raising and lowering of the free end of said lever, said valve casing having a discharge outlet below said diaphragm and in fluid communication with the open upper end of the standpipe when said diaphragm is in its released position, and a check valve between the open upper end of the standpipe and said discharge outlet preventing return flow of fluid from the discharge outlet to the standpipe.

4. In a ball cock having a valve casing, a standpipe supporting said valve casing and having its open end extending thereinto and a diaphragm extending across said casing and adapted when depressed to close the open end of said standpipe, the combination of an annular member forming the top wall of said valve casing, the underside of said member having a groove substantially tangential to the opening of the annular member, and a lever having a relatively short portion extending through said opening for contacting said diaphragm and an integral relatively longer portion at substantially right angles to the short portion, said longer portion extending transversely above said annular member and adapted to be attached at its free end to a float arm, said short portion having integral trunnions on one side seated in said groove for pivotal movement.

5. In a ball cock having a valve casing, a standpipe supporting said valve casing and having its open end extending thereinto and a diaphragm extending across said casing and adapted when depressed to close the open end of said standpipe, the combination of an annular member forming the top wall of said valve casing, the underside of said member having a groove substantially tangential to the opening of the annular member, and a lever having a relatively short portion extending through said opening for contacting said diaphragm and an integral relatively longer portion at substantially right angles to the short portion, said longer portion extending transversely above said annular member and adapted to be attached at its free end to a float arm, said short portion having integral trunnions on one side seated in said groove for pivotal movement, said trunnions being located relatively close to the free end of said short portion with the axis of the trunnions in close proximity to the side of said short portion so that on pivotal movement of the lever the end of the short portion will move substantially normal to said diaphragm and a relatively large mechanical advantage will be obtained when depressing said diaphragm.

6. In a ball cock having a valve casing, a standpipe supporting said valve casing and having its open end extending thereinto and a diaphragm extending across said casing and adapted when depressed to close the open end of said standpipe, the combination of an annular member forming the top wall of said valve casing, the underside of said member having a groove substantially tangential to the opening of the annular member, and a lever having a relatively short portion extending through said opening for contacting said diaphragm and an integral relatively longer portion at substantially right angles to the short portion, said longer portion extending transversely above said annular member and adapted to be attached at its free end to a float arm, said short portion having integral trunnions on one side seated in said groove for pivotal movement, and a travel limit adjusting screw connected to said lever and having an end adjacent said annular member for limiting pivotal movement of said lever.

References Cited in the file of this patent
UNITED STATES PATENTS

| | | |
|---|---|---|
| 1,639,997 | Haas | Aug. 23, 1927 |
| 1,641,756 | Haas | Sept. 6, 1927 |
| 2,294,785 | Langdon | Sept. 1, 1942 |
| 2,607,364 | Smith | Aug. 19, 1952 |
| 2,685,989 | Samuels | Aug. 10, 1954 |